United States Patent
Antoun et al.

(10) Patent No.: US 9,436,821 B2
(45) Date of Patent: Sep. 6, 2016

(54) SYSTEMS AND METHODS FOR DETECTING ATTEMPTS TO TRANSMIT SENSITIVE INFORMATION VIA DATA-DISTRIBUTION CHANNELS

(71) Applicant: Symantec Corporation, Mountain View, CA (US)

(72) Inventors: Ramzi Abi Antoun, San Francisco, CA (US); Michael Lindsay, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 66 days.

(21) Appl. No.: 14/483,131

(22) Filed: Sep. 10, 2014

(65) Prior Publication Data

US 2016/0070905 A1    Mar. 10, 2016

(51) Int. Cl.
*H04K 1/00* (2006.01)
*G06F 21/50* (2013.01)
*G06F 21/60* (2013.01)
*G06F 21/62* (2013.01)
*H04L 29/06* (2006.01)

(52) U.S. Cl.
CPC .............. *G06F 21/50* (2013.01); *G06F 21/60* (2013.01); *G06F 21/6209* (2013.01); *H04L 63/1408* (2013.01)

(58) Field of Classification Search
CPC ..... H04L 63/20; H04L 63/205; H04L 63/08; H04L 63/0263; H04L 63/0428; H04L 63/0227; H04L 63/1425
USPC .......................... 726/1–3, 11–14, 22–24, 26; 713/150–153
See application file for complete search history.

(56) References Cited

U.S. PATENT DOCUMENTS

| | | | | |
|---|---|---|---|---|
| 7,933,860 | B2* | 4/2011 | Asselstine | H04L 51/066 707/694 |
| 7,991,747 | B1* | 8/2011 | Upadhyay | G06F 11/004 707/674 |
| 8,060,596 | B1* | 11/2011 | Wootton | G06F 15/16 709/223 |
| 8,271,642 | B1* | 9/2012 | Sankararaman | G06F 21/554 340/506 |
| 2012/0183174 | A1 | 7/2012 | Basavapatna et al. | |
| 2015/0026464 | A1* | 1/2015 | Hanner, Sr. | H01L 63/1416 713/168 |

OTHER PUBLICATIONS

Joseph Chen; Systems and Methods for Enforcing Data Loss Prevention Policies on Mobile Devices; U.S. Appl. No. 13/903,994, filed May 28, 2013.
Sarin Sumit Manmohan; Systems and Methods for Detecting Data Leaks; U.S. Appl. No. 14/185,249, filed Feb. 20, 2014.

(Continued)

*Primary Examiner* — Hosuk Song
(74) *Attorney, Agent, or Firm* — ALG Intellectual Property, LLC

(57) ABSTRACT

The disclosed computer-implemented method for detecting attempts to transmit sensitive information via data-distribution channels may include (1) identifying an attempt to transmit a file through a data-distribution channel, (2) comparing, using an image-matching technique, the file with at least one known sensitive file that is both stored in an image format and protected by a data-loss-prevention policy, (3) determining, based on the results of the image-matching technique, that the file violates the data-loss-prevention policy, and (4) performing a security action in response to determining that the file violates the data-loss-prevention policy. Various other methods, systems, and computer-readable media are also disclosed.

20 Claims, 8 Drawing Sheets

(56) References Cited

OTHER PUBLICATIONS

"Nuance", http://www.nuance.com/index.htm, as accessed Jul. 21, 2014, Nuance Communications, Inc., (Feb. 8, 1998).

"Websense", http://www.websense.com/content/triton-ap-data.aspx, as accessed Jul. 21, 2014, (on or before Jul. 21, 2014).

"Computer vision", https://en.wikipedia.org/w/index.php?title=Computer_vision&oldid=623719213, Wikipedia, (Sep. 1, 2014).

* cited by examiner

SYSTEMS AND METHODS FOR DETECTING ATTEMPTS TO TRANSMIT SENSITIVE INFORMATION VIA DATA-DISTRIBUTION CHANNELS

BACKGROUND

Corporate networks and filing cabinets are often filled with sensitive data in the form of confidential emails, company-private documents, employee records, personally identifying information, tax forms, financial information, and more. This sensitive data may be spread across dozens or even hundreds of servers, personal computers, and/or hard copies. Ensuring that this data is kept secure may be very important for both a company's reputation and for its success. While companies may have data-loss-prevention (DLP) policies to ensure that sensitive data is handled correctly, with the myriad of ways to transmit data, from email to portable storage devices to faxes to file sharing, enforcing DLP policies has become more difficult than ever.

Traditional DLP systems typically examine outgoing hard-copy documents using optical character recognition techniques (OCR) to determine if their content is protected by a DLP policy. Unfortunately, OCR techniques are often both resource intensive and inaccurate. Accordingly, the instant disclosure identifies and addresses a need for additional and improved systems and methods for detecting attempts to transmit sensitive information via data-distribution channels.

SUMMARY

As will be described in greater detail below, the instant disclosure describes various systems and methods for detecting attempts to transmit sensitive information via data-distribution channels by treating all documents as images and then using image-processing techniques to extract features for comparison to a gallery of images protected by a DLP policy.

In one example, a computer-implemented method for detecting attempts to transmit sensitive information via data-distribution channels may include (1) identifying an attempt to transmit a file through a data-distribution channel, (2) comparing, using an image-matching technique, the file with at least one known sensitive file that is both stored in an image format and protected by a DLP policy, (3) determining, based on the results of the image-matching technique, that the file violates the DLP policy, and (4) performing a security action in response to determining that the file violates the DLP policy.

In some embodiments, the security action may include (1) blocking the attempt to transmit the file through the data-distribution channel, (2) alerting an administrator to the attempt to transmit the file through the data-distribution channel, (3) informing a user that the attempt to transmit the file through the data-distribution channel violates the DLP policy, and/or (4) logging the attempt to transmit the file through the data-distribution channel.

The file may be compared with the known sensitive file in a variety of ways. In one embodiment, comparing the file with the known sensitive file may include converting the file into an image format. In some examples, comparing the file with the known sensitive file may include creating a difference image that represents a set of elements that are different between the known sensitive file and the file.

Additionally or alternatively, comparing the file with the known sensitive file (within the image domain) may include identifying a set of key points within the file that are homologous to a set of key points within the known sensitive file. In addition, comparing the file with the known sensitive file may include (1) comparing a single visual element of the file to a single visual element of the known sensitive file, (2) comparing a set of distance ratios between key features of the file to a set of distance ratios between key features of the known sensitive file, and/or (3) comparing, using a distance metric, a set of feature vectors belonging to the file to a set of feature vectors belonging to the known sensitive file.

In some examples, the image comparison may involve several steps. In one embodiment, comparing the file with the known sensitive may include (1) identifying a gallery of known sensitive files that are both stored in image formats and protected by the data loss prevention policy, (2) comparing, using a coarse image-matching technique, the file and a plurality of known sensitive files in the gallery, (3) comparing, using a finer image-matching technique that consumes more computing resources than the coarse image-matching technique, the file and a plurality of known sensitive files within the gallery not discarded by the coarse image-matching technique, and (4) comparing, using a final image-matching technique that consumes more computing resources than the finer image-matching technique, the file and a plurality of known sensitive files within the gallery not discarded by the finer image-matching technique.

In one embodiment, determining, based on the results of the image-matching technique, that the file violates the DLP policy may include determining that the file includes personally identifying information. For example, the known sensitive file may include a text-based form and determining that the file violates the DLP policy may include determining that the file includes an edited version of the text-based form that includes personally identifying information.

In some examples, the computer-implemented method may be applied to data at rest. For example, the computer-implemented method may further include (1) identifying an additional file that is stored on the computing device, (2) comparing, using the image-matching technique, the additional file with at least one additional known sensitive file that is both stored in an image format and protected by the DLP policy, (3) determining, based on the image-matching technique, that the additional file violates the DLP policy, and (4) performing an additional security action in response to determining that the additional file violates the DLP policy.

In one embodiment, a system for implementing the above-described method may include (1) an identification module, stored in memory, that identifies an attempt to transmit a file through a data-distribution channel, (2) a comparison module, stored in memory, that compares, using an image-matching technique, the file with at least one known sensitive file that is both stored in an image format and protected by a DLP policy, (3) a determination module, stored in memory, that determines, based on the results of the image-matching technique, that the file violates the DLP policy, (4) a security module, stored in memory, that performs a security action in response to determining that the file violates the DLP policy, and (5) at least one physical processor configured to execute the identification module, the comparison module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an attempt to transmit a file through a data-distribution channel, (2) compare, using an image-matching technique, the file with at least one known sensitive file that is both stored in an image format and protected by a DLP policy, (3) determine, based on the results of the image-matching technique, that the file violates the DLP policy, and (4) perform a security action in response to determining that the file violates the DLP policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
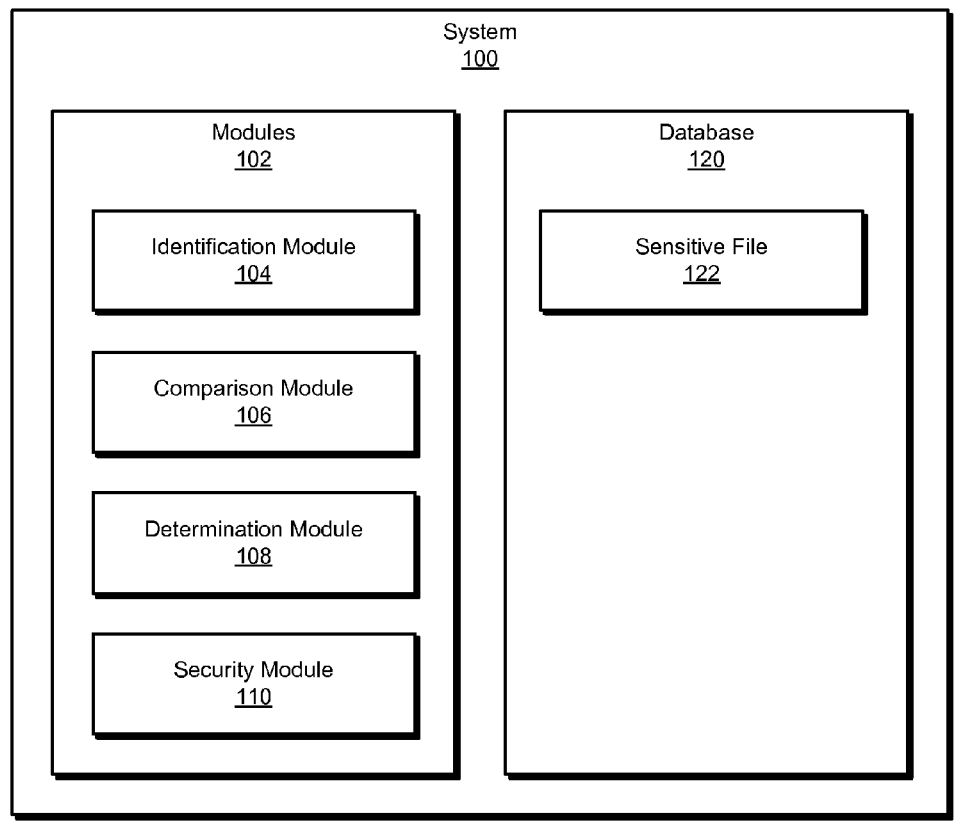
FIG. 1 is a block diagram of an exemplary system for detecting attempts to transmit sensitive information via data-distribution channels.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting attempts to transmit sensitive information via data-distribution channels. As will be explained in greater detail below, by treating all documents as images, the systems described herein may efficiently compare documents while avoiding problems inherent to OCR. If a document is found to be a version of a sensitive document, the systems described herein may detect, locate, and/or highlight changes between the versions of the document in order to identify DLP policy violations and/or make such violations more readily reviewable.

Figure 2:
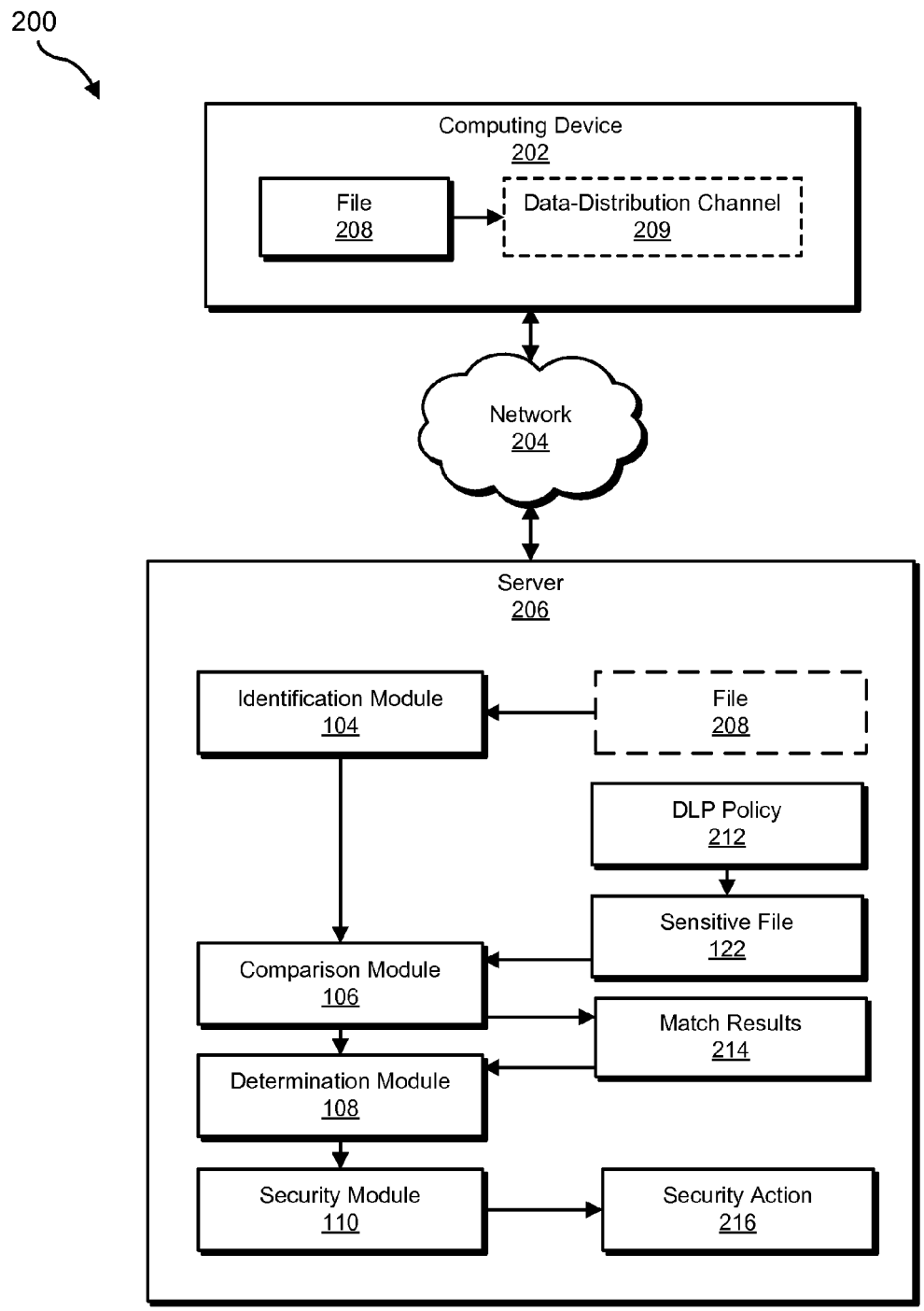
FIG. 2 is a block diagram of an additional exemplary system for detecting attempts to transmit sensitive information via data-distribution channels.
Figure 3:
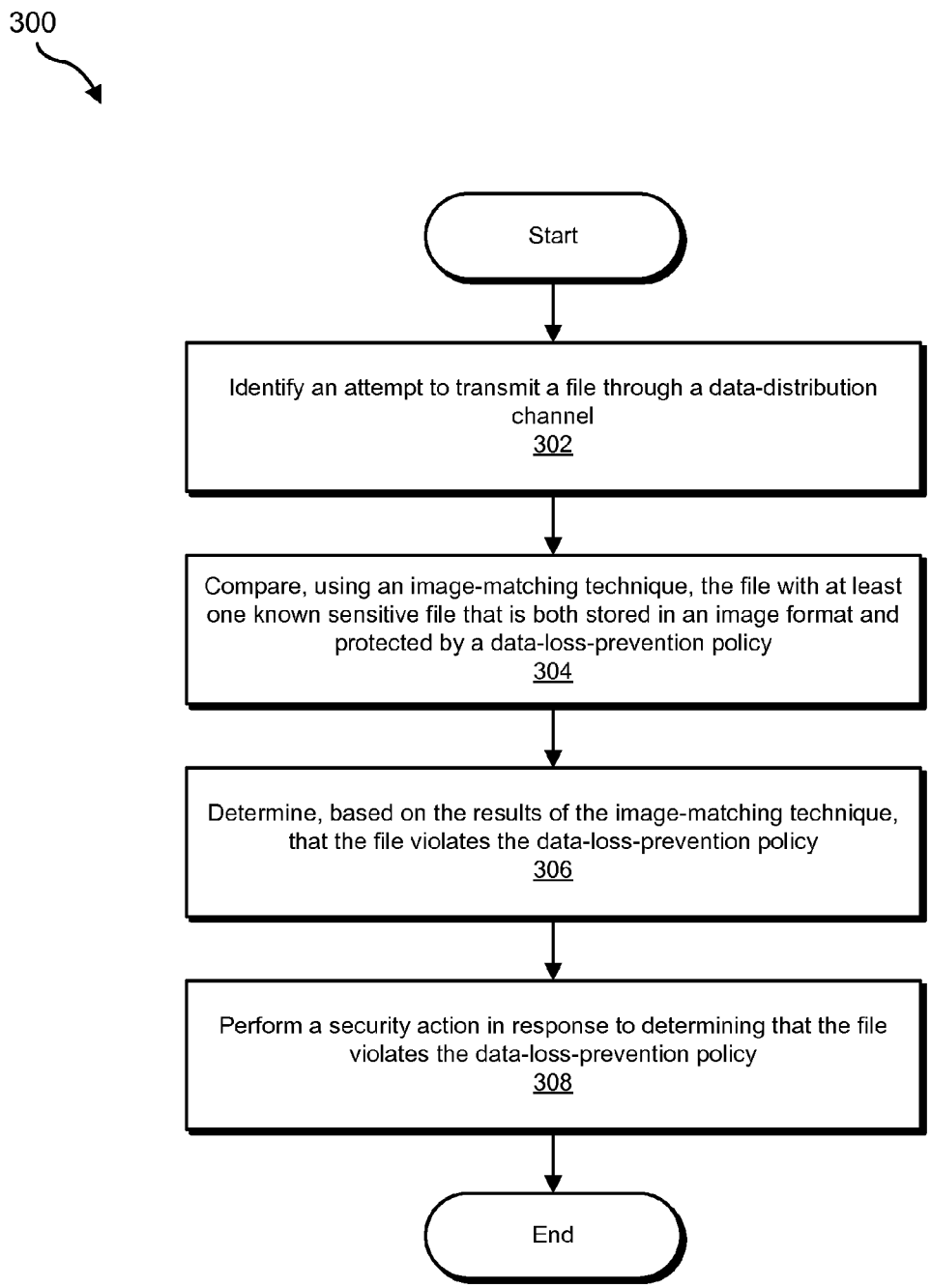
FIG. 3 is a flow diagram of an exemplary method for detecting attempts to transmit sensitive information via data-distribution channels.
Figure 4:
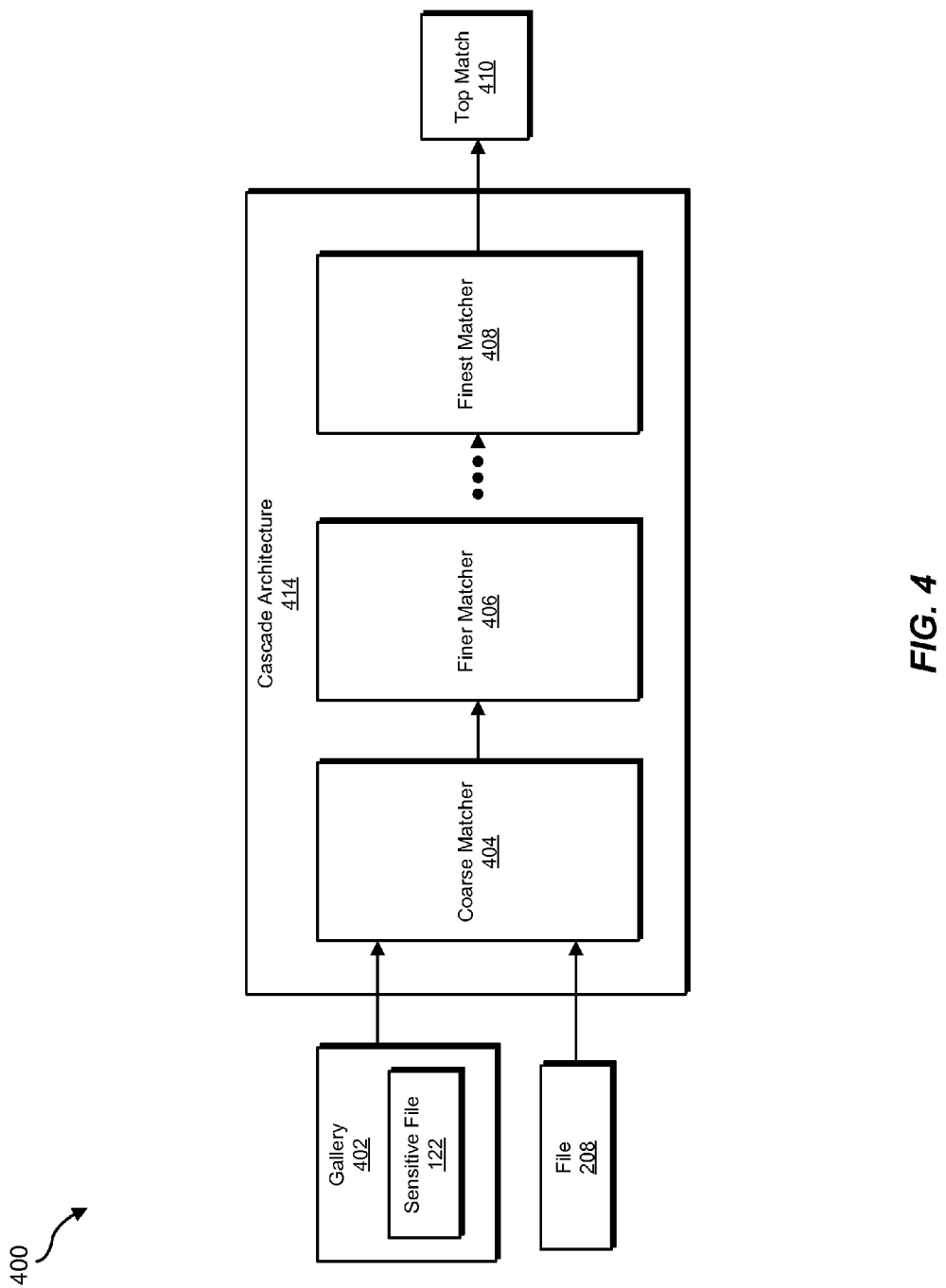
FIG. 4 is a block diagram of an exemplary system for detecting attempts to transmit sensitive information via data-distribution channels.

The following will provide, with reference to FIGS. 1, 2 and 4, detailed descriptions of exemplary systems for detecting attempts to transmit sensitive information via data-distribution channels. Detailed descriptions of corresponding computer-implemented methods will also be provided in connection with FIGS. 3, 5 and 6. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for detecting attempts to transmit sensitive information via data-distribution channels. As illustrated in this figure, exemplary system 100 may include one or more modules 102 for performing one or more tasks. For example, and as will be explained in greater detail below, exemplary system 100 may include an identification module 104 that may identify an attempt to transmit a file through a data-distribution channel. Exemplary system 100 may additionally include a comparison module 106 that may compare, using an image-matching technique, the file with at least one known sensitive file 122 that may be both stored in an image format and protected by a data-loss-prevention policy. Exemplary system 100 may also include a determination module 108 that may determine, based on the results of the image-matching technique, that the file violates the data-loss-prevention policy. Exemplary system 100 may additionally include a security module 110 that may perform a security action in response to determining that the file violates the data-loss-prevention policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store sensitive file(s) 122. Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect attempts to transmit sensitive files via data-distribution channels. For example, and as will be described in greater detail below, identification module 104 may identify an attempt to transmit a file 208 through a data-distribution channel 209. Comparison module 106 may then compare, using an image-matching technique, file 208 with at least one known sensitive file 122 that is both stored in an image format and protected by a DLP policy 212. Determination module 108 may then determine, based on match results 214, that file 208 violates DLP policy 212. Finally, security module 110 may execute a security action 216 in response to determining that file 208 violates DLP policy 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device that is capable of storing a gallery of images. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for detecting attempts to transmit sensitive information via data-distribution channels. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302, one or more of the systems described herein may identify an attempt to transmit a file through a data-distribution channel. For example, identification module 104 may, as part of server 206 in FIG. 2, identify an attempt to transmit file 208 through data-distribution channel 209.

The term "data-distribution channel," as used herein, generally refers to any type or form of communication pathway, computing system, and/or executable code capable of dispersing digital information from one entity to another. Examples of data-distribution channels include, without limitation, computing devices, mobile communication devices, email accounts, text-messaging services, social networking platforms, Internet and Ethernet networks, servers, removable storage devices, data transfer cables, and/or any other suitable communication channel.

Identification module 104 may identify an attempt to transmit a file in a variety of ways and/or contexts. For example, identification module 104 may be installed on an endpoint device and may monitor data-distribution channels on the endpoint device, such as universal serial bus (USB) ports, network connections, file transfer protocol clients, and/or email clients. In another example, identification module 104 may be installed on a network gateway and may monitor network traffic. For example, identification module 104 may monitor a fax machine to identify attempts to transmit sensitive information via outgoing faxes. In some embodiments, identification module 104 may only identify attempts to transmit files to destinations outside of a secure environment. In other embodiments, identification module 104 may identify any attempt to transmit a file via a data-distribution channel.

In some embodiments, identification module 104 may, upon identifying an attempt to transmit a file (and prior to performing step 304), perform a preliminary analysis on the file in order to determine whether further analysis is warranted. In one embodiment, this preliminary analysis may involve analyzing a color histogram for the file. For example, identification module 104 may determine, by analyzing a color histogram for a file, that the file is a brightly colored image (e.g., a vacation photo) and is therefore unlikely to match black and white forms that include sensitive information. In this example, identification module 104 may allow the attempt to transmit the file and/or may refrain from passing the file along to comparison module 106 for further analysis. By performing this initial analysis, identification module 104 may quickly determine that some images may not be subject to DLP policies and may thus save the additional resources that would otherwise have been required to more thoroughly analyze the images.

At step 304, one or more of the systems described herein may compare, using an image-matching technique, the file with at least one known sensitive file that is both stored in an image format and protected by a DLP policy. For example, comparison module 106 may, as part of server 206 in FIG. 2, compare, using an image-matching technique, file 208 with at least one known sensitive file 122 that is both stored in an image format and protected by DLP policy 212.

The term "image-matching technique," as used herein, generally refers to any method or combination of methods used to determine whether one image is similar to another. Image-matching techniques may include both global and local image-processing and/or computer-vision techniques. Global techniques analyze the image as a whole, while local techniques focus on a set of interest points in an image. In some examples, a local image-matching technique may include a technique that extracts feature vectors called descriptors around automatically or manually determined key points from an image, such as scale-invariant feature transform (SIFT) techniques, speeded-up robust features (SURF) techniques, and/or oriented fast and rotated brief (ORB) techniques. These descriptors typically offer a degree of invariance with respect to scale, illumination, rotation, and perspective changes. Examples of global image-matching techniques include, but are not limited to, histogram-matching, correlation-filters, principal component analysis (PCA), linear discriminant analysis (LDA), etc.

The term "image format," as used herein, generally refers to any data storage format that may be rendered as a two dimensional array of pixels. In some embodiments, an image format may include data describing each pixel and/or data containing geometric descriptions of an image. In some examples, files stored in an image format may be pictures of forms and/or other objects. Examples of image formats include, without limitation, raster image formats, bitmap image formats, graphics interchange format, portable network graphics, vector image formats, compound image formats, and/or stereo image formats.

The term "sensitive file," as used herein, generally refers to any file that may be protected by a DLP policy. In addition, the terms "data-loss-prevention policy" or "DLP policy," as used herein, generally refer to any policy and/or system designed to detect and/or prevent potential data breaches. DLP systems may act on data which may be in use, in motion, and/or at rest. DLP systems may include policies about the storage and/or transmission of data, software configured to enforce DLP policies, physical enforcement of DLP policies, and/or hardware modifications that may prevent the transmission of data. Examples of DLP policies may include, without limitation, "company private data may not be copied to movable storage media," "personally identifying information may not be emailed," and/or "tax forms may not be faxed." Similarly, examples of DLP enforcement may include, without limitation, preventing write requests to portable storage media, filtering outgoing emails to detect sensitive data, preventing access to sensitive data while devices are on unsecured networks, and/or blocking faxes containing sensitive data.

Comparison module 106 may compare the files in a variety of ways and/or contexts. For example, comparison module 106 may be part a DLP policy enforcement application that may use a variety of methods to determine whether a file includes sensitive information. In other embodiments, comparison module 106 may be part of a general purpose image-comparison application.

In some examples, comparison module 106 may compare the file with the known sensitive file by converting the file into an image format. For example, a file may not be in an image format and thus may need to be converted before being compared to a sensitive file that is stored in an image format. Specifically, the file may be in the form of a fax, a portable document format file, a text file, and/or a .DOC file. As such, comparison module 106 may convert the non-image file into an image format by rendering it at a given resolution before proceeding. For example, comparison module 106 may convert file 208 from a text file into a bitmap file (using, e.g., one or more of a variety of conversion techniques) before attempting to compare the same to a gallery of known sensitive files stored in image format.

In some embodiments, comparison module 106 may identify, using the image-matching technique, a set of key points within the file that are homologous to a set of key points within the known sensitive file. For example, comparison module 106 may compare, using the image-matching technique, file 208 with sensitive file 122 using a distance metric related to the image-matching technique employed. If more than one sensitive file 122 is present in the database, comparison module 106 may measure the similarity between file 208 and each of the files in the database to determine if one or more files produce a match.

For example, using local image matching techniques such as those described above that generate image descriptors (for every key point identified, e.g., either automatically or by an administrator) that are tolerant to rotation, scaling, illumination, and perspective changes, comparison module 106 may measure the distance between descriptors belonging to file 208 and descriptors belonging to sensitive file 122. If the descriptors consist of a vector of floating values, an L2 or L1 distance metric might be used. If the descriptors consist of a vector of Boolean values, an L0 or Hamming distance maybe used to measure the similarity. Any other suitable distance metric may also be used.

Additionally, comparison module 106 may, based on the spatial distribution of the set of matching descriptors, estimate a geometric transformation that will map file 208 to the best-matching sensitive file in a gallery of known sensitive files. This mapping may include a homography and/or projective transformation to correct for misalignment.

In other embodiments, comparison module 106 may compare, using the image-matching technique, the file with the known sensitive file by at least one of (1) comparing a single visual element of the file to a single visual element of the known sensitive file, (2) comparing a set of distance ratios between key features of the file to a set of distance ratios between key features of the known sensitive file, and/or (3) comparing, using an appropriate distance metric, a set of feature vectors belonging to the file to a set of feature vectors belonging to the known sensitive file.

For example, comparison module 106 may identify an important visual element of sensitive file 122 and examine file 208 for the presence of the important visual element. Examples of visual elements include, without limitation, a region of a single color, a straight line, or a geometric shape (e.g., a circle, a square, a triangle, or any other appropriate shape). In addition, comparison module 106 may locate a line in a particular region of sensitive file 122 and locate a line with a similar length and in a similar location within file 208. Based on this comparison, comparison module 106 may determine that file 208 matches sensitive file 122.

Comparison module 106 may additionally or alternatively identify a set of key points contained within file 208 and calculate the ratios of the distances between them. If sensitive file 122 contains key points with distance ratios similar to those within file 208, comparison module 106 may determine that file 208 is similar to sensitive file 122.

In some embodiments, comparison module 106 may compare, using the image-matching technique, the file with the known sensitive file that is both stored in the image format and protected by the data loss prevention policy by (1) identifying a gallery of known sensitive files that are both stored in image formats and protected by the data loss prevention policy, (2) comparing, using a coarse image-matching technique, the file and a plurality of known sensitive files in the gallery, (3) comparing, using a finer image-matching technique that consumes more computing resources than the coarse image-matching technique, the file and a plurality of known sensitive files within the gallery not discarded by the coarse image-matching technique, and (4) comparing, using a final image-matching technique that consumes more computing resources than the finer image-matching technique, the file and a plurality of known sensitive files within the gallery not discarded by the finer image-matching technique. The cascade architecture described above may be designed to significantly speed-up the identification of sensitive file 122, especially if the database of sensitive files is large. The cascade architecture, which may consist of a series of sub-matchers, sorted by increasing complexity and matching power from the coarsest to the finest, offers two main advantages. First, the cascade architecture may enable comparison module 106 to narrow down the search space by progressively eliminating easy non-matches without spending too many resources, and focusing on the more challenging potential-matches that require a finer match and more analysis that consumes more resources. Second, the cascade architecture may enable comparison module 106 to exit early by determining early on and without spending too many resources that a match to query file 208 is not present in the gallery of sensitive files.

As illustrated in FIG. 4, a cascade architecture 414 may compare file 208 to any or all files in a gallery 402 that may store a variety of sensitive files, in some examples including sensitive file 112. Cascade architecture 414 may include a coarse matcher 404, a finer matcher 406, and/or a finest matcher 408. In some embodiments, cascade architecture may include any number of additional matchers between finer matcher 406 and finest matcher 408. In one example, coarse matcher 404 may compare file 208 to the files in gallery 402. If no file in gallery 402 is similar to file 208 according to coarse matcher 404, the systems described herein may exit the cascade architecture at that point. Next, finer matcher 406 may compare file 208 to the remaining files in gallery 402 not excluded by coarse matcher 404. If no file in gallery 402 is similar to file 208 according to finer matcher 406, the systems described herein may exit the cascade architecture. This process may repeat for any number of matches until finest matcher 408 either produces a top match 410 for file 208 out of the files in gallery 402 or determines that there is no match to file 208 in gallery 402.

Returning to FIG. 3, at step 306, one or more of the systems described herein may determine, based on the results of the image-matching technique, that the file violates the DLP policy. For example, determination module 108 may, as part of server 206 in FIG. 2, determine, based on match results 214, that file 208 violates DLP policy 212.

Determination module 108 may determine that the file violates the DLP policy in a variety of ways and/or contexts. For example, determination module 108 may receive information from comparison module 106 that demonstrates a similarity between file 208 and sensitive file 122, which may be protected by DLP policy 212. As an example, DLP policy 212 may state that employee emergency contact forms should not be emailed to third parties. In this example, sensitive file 122 may constitute a blank emergency contact form, and file 208 may constitute a filled in version of the emergency contact form. As such, determination module 108 may determine that the attempt to transmit file 208 constitutes a violation of DLP policy 212.

In one embodiment, the known sensitive file may include a text-based form and determining, based on the results of the image-matching technique, that the file violates the DLP policy may include determining that the file includes an edited version of the text-based form. For example, file 208 may include a text-based form and comparison module 106 may determine that file 208 contains enough similar key points to sensitive file 122 to be deemed a match, and additionally contains other image elements not contained within sensitive file 122. Based on such a comparison, comparison module 106 may determine that file 208 constitutes an edited version of sensitive file 122, and determination module 108 may determine that an attempt to transmit file 208 constitutes a breach of DLP policy 212 because sensitive file 122 includes fields requesting personally identifying information, such as a social security number.

Figure 5:
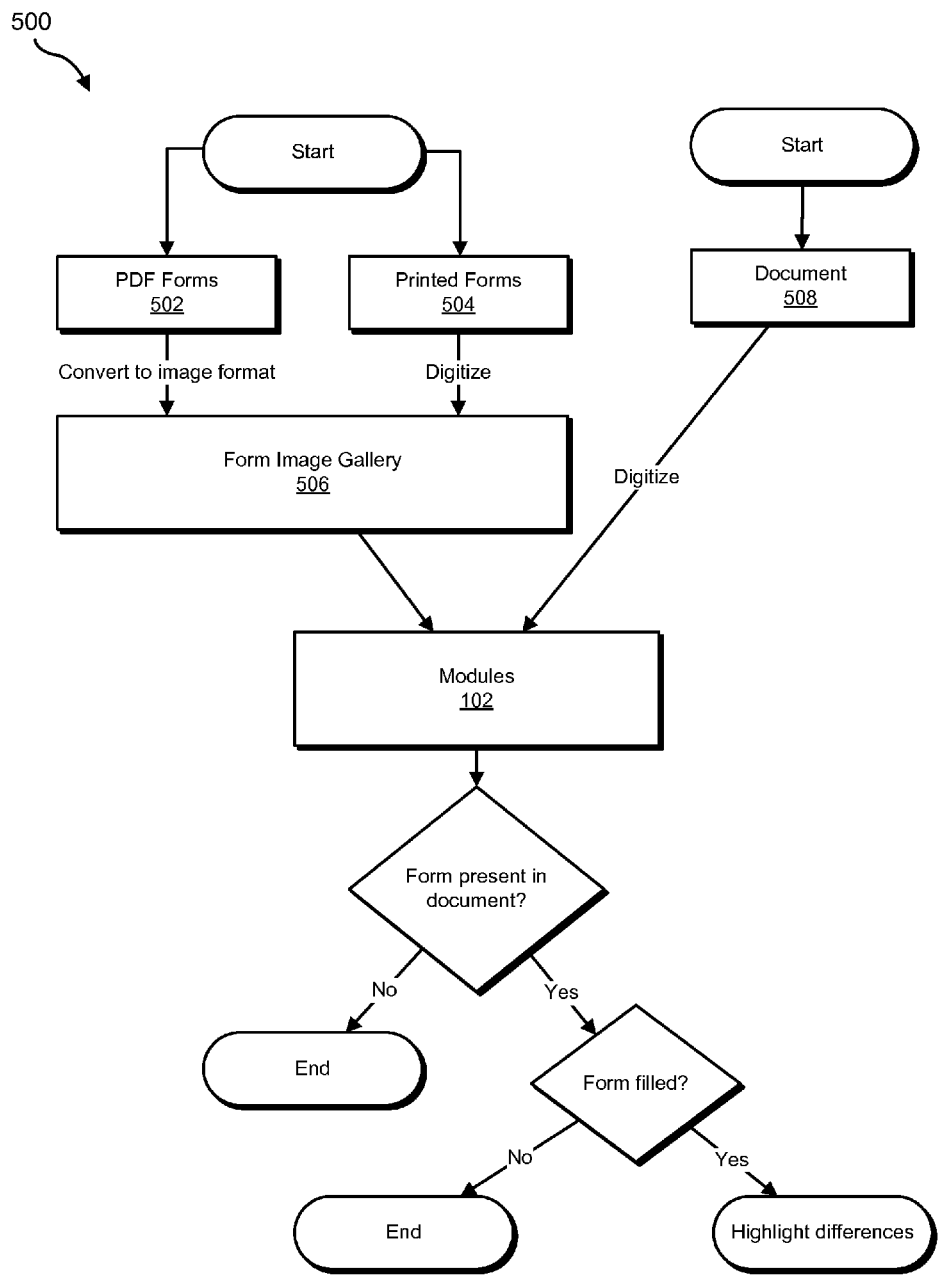
FIG. 5 is a flow diagram of an exemplary method for detecting attempts to transmit sensitive information via data-distribution channels.

In some examples, forms may be digitized and added to an image gallery to create a sample or corpus of known sensitive files. For example, and as illustrated in FIG. 5, modules 102 may receive a digitized version of document 508 and have access to form image gallery 506. Form image gallery 506 may include digital representations of files known to be protected by DLP policies, and the files may be embodied by items such as PDF form 502 or printed form 504. Examples of printed form 504 may include, without limitation, tax documents, payroll documents, patent disclosure forms, research notes, or any other suitable physical representation of information. Modules 102 may examine document 508 to determine if elements of a form from form image gallery 506 is present within document 508. If modules 102 find that elements from the form are present in document 508, modules 102 may then examine document 508 for any regions that may have been filled in and highlight regions of document 508 that contain the alterations.

In an exemplary embodiment for highlighting differences between a document and a sensitive file, comparison module 106 may compare, using the image-matching technique, the file with the known sensitive file by creating a difference image that represents a set of elements that are different between the known sensitive file and the file. This difference image may be created by subtracting the value of each pixel of sensitive file 122 from the corresponding pixel of file 208. Comparison module 106 may employ certain image processing techniques beyond a simple pixel-to-pixel subtraction to generate this difference image, in a way that will make this difference image operation robust to minor alignment errors that could be produced by image transformation generated by identification module 104. Examples of image processing techniques include, but are not limited to, morphological operations such as dilation, erosion, etc.

Similarly, comparison module 106 may further employ morphological operations on the difference image in order to emphasize and enhance the highlighting of differences between file 208 and sensitive file 122. The difference image may then be used by comparison module 106 or determination module 108 in further steps of image analysis, or delivered to security module 110 as part of a security action 216.

The term "morphologically dilate", as used herein, refers to an image manipulation technique where the value of a given pixel is applied to other pixels within a given radius. Examples of applying the value of a given pixel include, without limitation, adding the value of the given pixel to the surrounding pixels and/or averaging the values of the pixel and the surrounding pixels. Other types of morphological operations might also be employed by any of the modules described herein.

Figure 6:
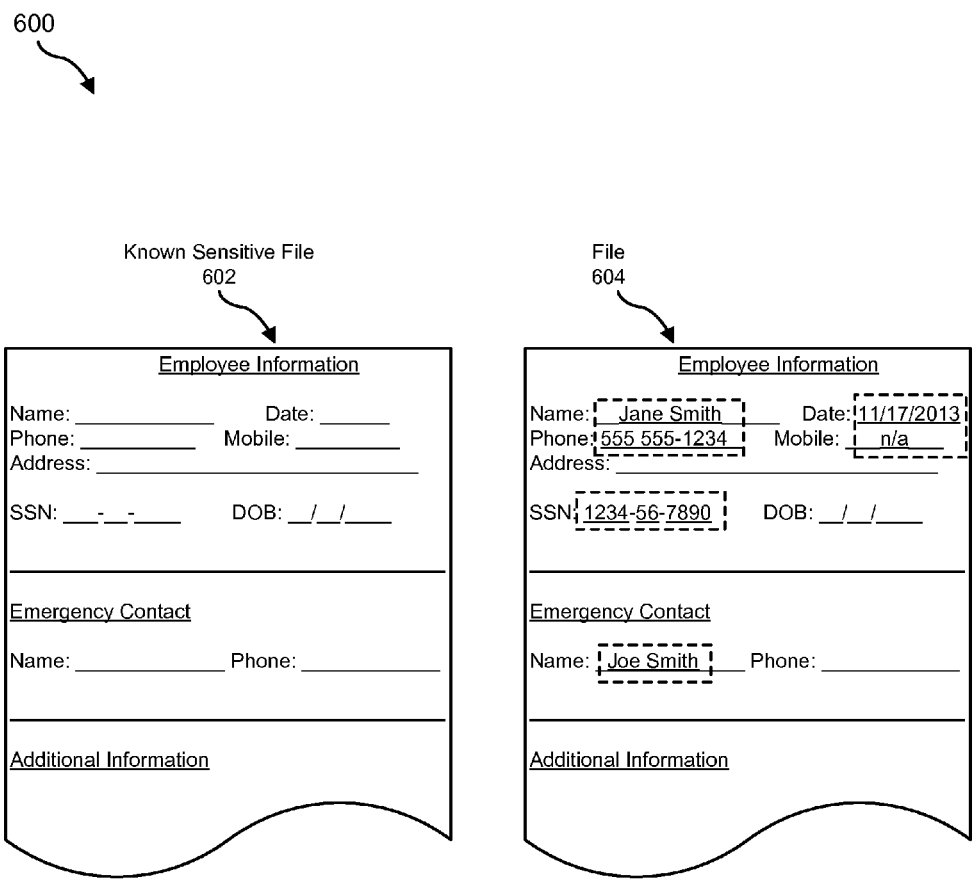
FIG. 6 is a block diagram of an exemplary output of an exemplary computing system for detecting attempts to transmit sensitive information via data-distribution channels.

In some examples, determination module 108 may determine that the file violates the DLP policy based at least in part on a highlighted difference image. FIG. 6 is an exemplary output of a highlighting operation. In this example, known sensitive file 602 may be a form with fields for employee information. File 604 may include a filled in copy of known sensitive file 602 containing personal information for an employee named Jane Smith. The fields for name, date, phone number, mobile number, social security number, and emergency contact name have been filled in with information pertaining to Jane Smith. The regions bounded by dotted boxes denote regions that may be highlighted following the subtraction of known sensitive file 602 from file 604. In this example, file 602 may violate a DLP policy that states that no files including social security numbers may be transmitted via data-distribution channels.

In some examples, determination module 108 may determine that the file includes an annotation of some type that violates a DLP policy, even if the annotation does not contain OCR-parseable text. For example, determination module 108 may determine that differences between image files indicate that a file includes one or more signatures, watermarks, stamps, highlights, margin notes, and/or other annotations. In this example, even though traditional OCR techniques would have been unable to parse the annotation, the image-matching technique used by the systems described herein may still identify potential DLP policy violations that contain illegible text or no text at all, resulting in an effectively content-agnostic approach to DLP enforcement.

In one embodiment, determination module 108 may determine, based on the results of the image-matching technique, that the file violates the DLP policy by determining that the file includes personally identifying information. Determination module 108 may ascertain that a DLP policy violation has occurred by utilizing a difference image and/or a set of highlighted differences produced by comparison module 106. For example, determination module 108 may determine, based on regions of difference, that sensitive information has been entered into a form. Additionally or alternatively, determination module 108 may determine that a photograph contains a representation of sensitive information, such as a prototype device based on matching key points within the photograph to key points within a known sensitive file.

Returning to FIG. 3, at step 308, one or more of the systems described herein may perform a security action in response to determining that the file violates the DLP policy. For example, security module 110 may, as part of server 206 in FIG. 2, perform a security action 216 in response to determining that file 208 violates DLP policy 212.

Security module 110 may perform a security action in a variety of ways. For example, security module 110 may perform a security action by (1) blocking the attempt to transmit the file through the data-distribution channel, (2) alerting an administrator to the attempt to transmit the file through the data-distribution channel, (3) informing a user that the attempt to transmit the file through the data-distribution channel violates the DLP policy, and/or (4) logging the attempt to transmit the file through the data-distribution channel. For example, security module 110 may block an email that includes a sensitive file as an attachment and/or forward the email to an administrator.

In one example, the systems described herein may identify a file at rest that is subject to a DLP policy. For example, an administrator may run a scan on a computing device to determine if any files stored on the computing device are subject to a DLP policy. In this example, and with reference to FIG. 2, (1) identification module 104 may identify an additional file that is stored on computing device 202, (2) comparison module 106 may compare, using an image-matching technique, the additional file with at least one additional known sensitive file that is both stored in an image format and protected by a DLP policy, (3) determination module 108 may determine, based on the image-matching technique, that the additional file violates the DLP policy, and (4) security module 110 may perform an additional security action in response to determining that the additional file violates the DLP policy.

As explained in connection with method 300 above, the systems described herein may compare files being transmitted via data-distribution channels to a gallery of reference documents (provided, e.g., by a user or administrator) to determine whether the transmitted files are protected by a DLP policy. The systems described herein may treat the reference documents and the document being transmitted as image files, and may perform computer-vision techniques on the images in order to determine whether they represent versions of the same document. If the transmitted document matches a gallery image, the systems described herein may perform further analysis to highlight the differences, for example by highlighting filled-out fields in a text-based form. By treating all of the documents to be compared as images, the systems described herein may efficiently make determinations about whether documents are subject to a DLP policy without being burdened by the overhead and/or difficulties associated with OCR.

Figure 7:
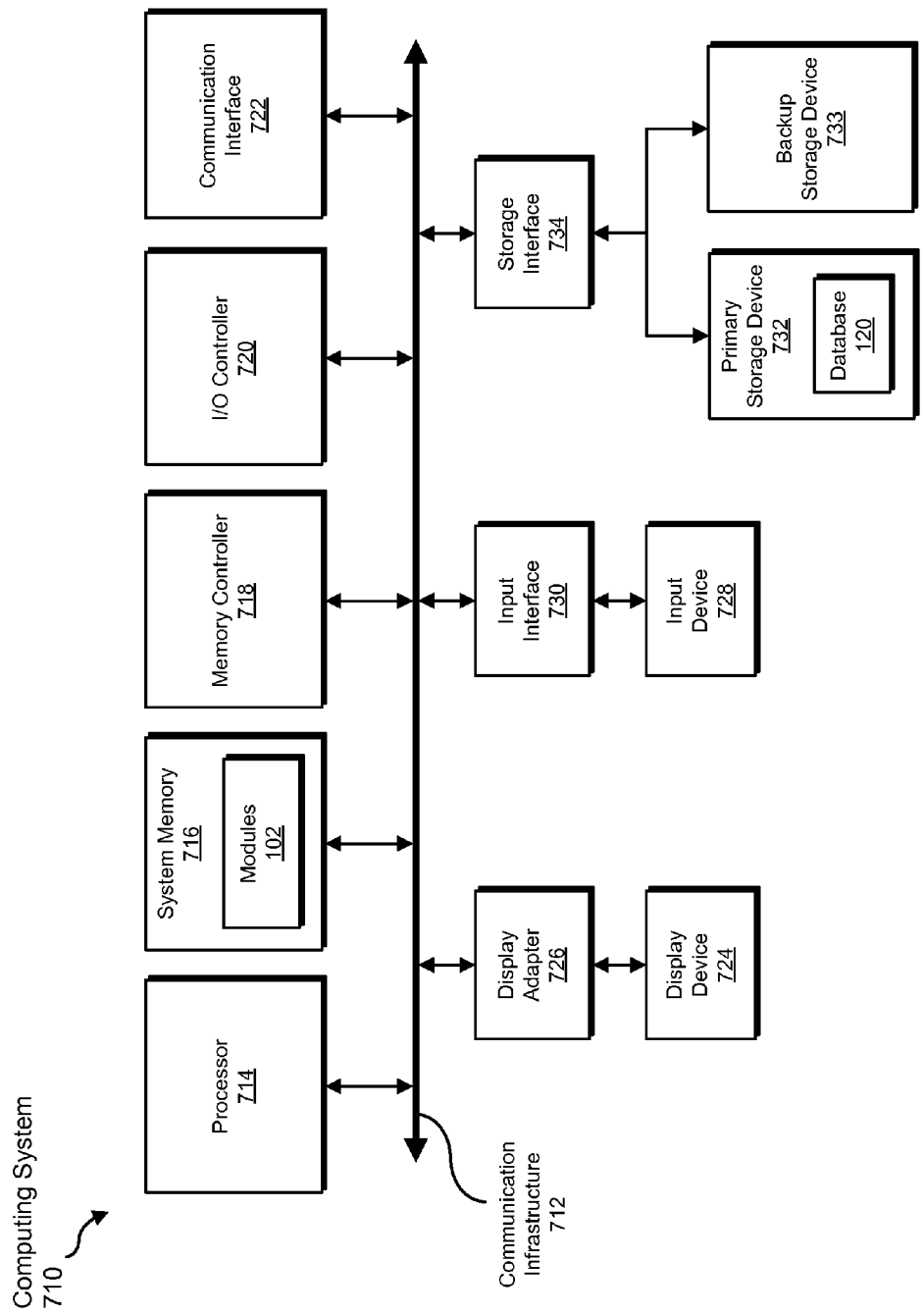
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, USB host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
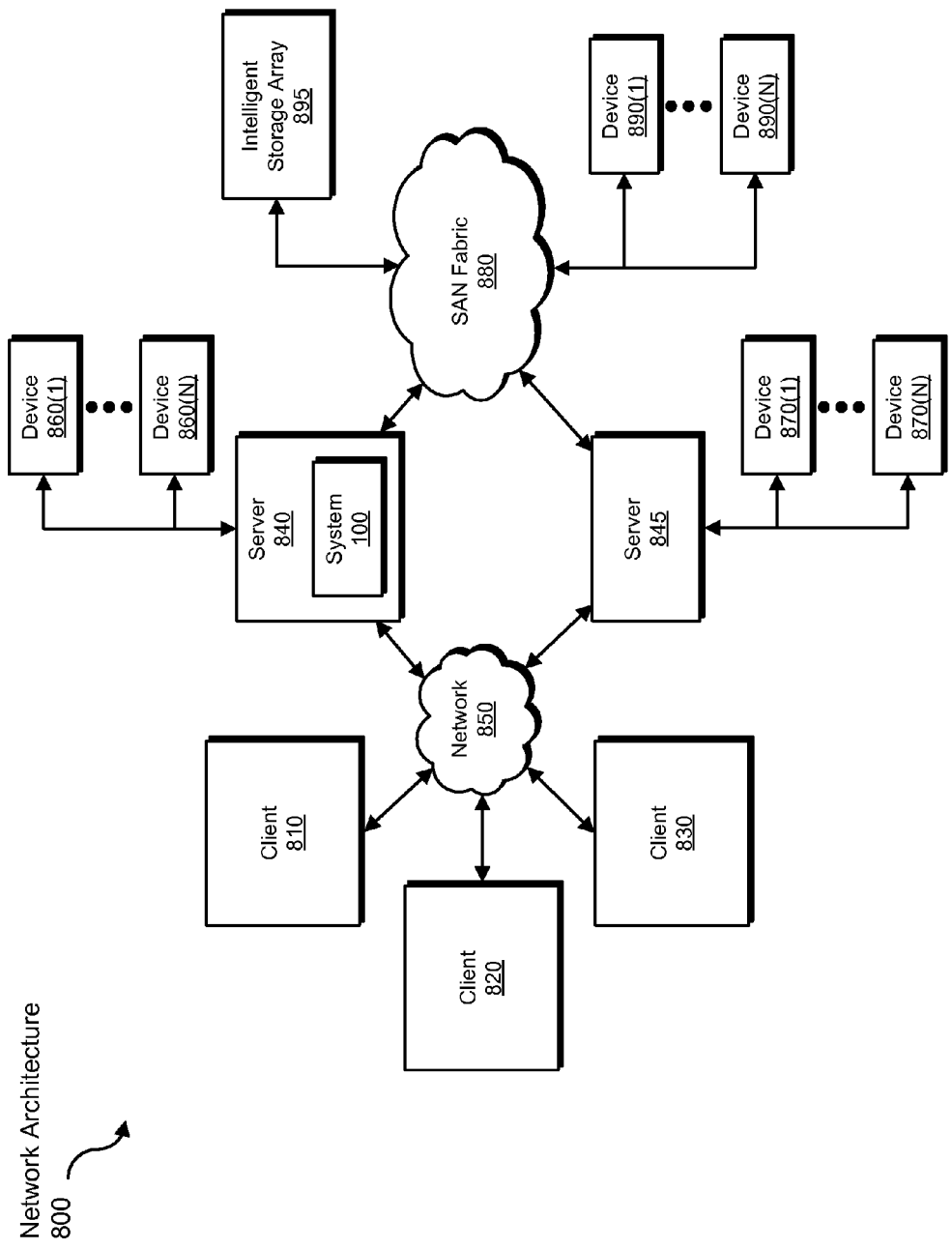
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for detecting attempts to transmit sensitive information via data-distribution channels.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive file data to be transformed, transform the file data, output a result of the transformation to an image-matching technique, use the result of the transformation to determine whether two images represent the same document, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including"

and "having" (and their derivatives), as used in the specification and claims, are interchangeable with and have the same meaning as the word "comprising."

What is claimed is:

1. A computer-implemented method for detecting attempts to transmit sensitive information via data-distribution channels, at least a portion of the method being performed by a computing device comprising at least one processor, the method comprising:
   identifying an attempt to transmit a file through a data-distribution channel;
   comparing, using an image-matching technique, the file with a plurality of known sensitive files that are both stored in image formats and protected by a data-loss-prevention policy;
   comparing, using a finer image-matching technique that consumes more computing resources than the image-matching technique, the file and at least one known sensitive file from the plurality of known sensitive files that was not discarded by the image-matching technique;
   determining, based on the results of the finer image-matching technique, that the file violates the data-loss-prevention policy;
   performing a security action in response to determining that the file violates the data-loss-prevention policy.

2. The computer-implemented method of claim 1, wherein the security action comprises at least one of:
   blocking the attempt to transmit the file through the data-distribution channel;
   alerting an administrator to the attempt to transmit the file through the data-distribution channel;
   informing a user that the attempt to transmit the file through the data-distribution channel violates the data-loss-prevention policy;
   logging the attempt to transmit the file through the data-distribution channel.

3. The computer-implemented method of claim 1, wherein comparing, using the image-matching technique, the file with the plurality of known sensitive files comprises converting the file into the image format.

4. The computer-implemented method of claim 1, wherein the known sensitive file comprises a text-based form and determining, based on the results of the finer image-matching technique, that the file violates the data-loss-prevention policy comprises determining that the file comprises an edited version of the text-based form.

5. The computer-implemented method of claim 1, wherein comparing, using the finer image-matching technique, the file with the known sensitive file comprises creating a difference image that represents a set of elements that are different between the known sensitive file and the file.

6. The method of claim 1, wherein comparing, using the finer image-matching technique, the file with the known sensitive file comprises identifying a set of key points within the file that are homologous to a set of key points within the known sensitive file.

7. The method of claim 1, wherein comparing, using the finer image-matching technique, the file with the known sensitive file comprises at least one of:
   comparing a single visual element of the file to a single visual element of the known sensitive file;
   comparing a set of distance ratios between key features of the file to a set of distance ratios between key features of the known sensitive file;
   comparing, using a distance metric, a set of feature vectors belonging to the file to a set of feature vectors belonging to the known sensitive file.

8. The computer-implemented method of claim 1:
   wherein comparing, using the image-matching technique, the file with the plurality of known sensitive files comprises identifying a gallery of known sensitive files that are both stored in the image formats and protected by the data loss prevention policy;
   further comprising comparing, using a final image-matching technique that consumes more computing resources than the finer image-matching technique, the file and at least one known sensitive file within the gallery not discarded by the finer image-matching technique.

9. The computer-implemented method of claim 1, wherein determining, based on the results of the finer image-matching technique, that the file violates the data-loss-prevention policy comprises determining that the file includes personally identifying information.

10. The computer-implemented method of claim 1, further comprising:
    identifying an additional file that is stored on the computing device;
    comparing, using the image-matching technique, the additional file with at least one additional known sensitive file that is both stored in an image format and protected by the data-loss-prevention policy;
    determining, based on the image-matching technique, that the additional file violates the data-loss-prevention policy;
    performing an additional security action in response to determining that the additional file violates the data-loss-prevention policy.

11. A system for detecting attempts to transmit sensitive information via data-distribution channels, the system comprising:
    an identification module, stored in memory, that identifies an attempt to transmit a file through a data-distribution channel;
    a comparison module, stored in memory, that:
      compares, using an image-matching technique, the file with a plurality of known sensitive files that are both stored in image formats and protected by a data-loss-prevention policy;
      compares, using a finer image-matching technique, the file with at least one known sensitive file from the plurality of known sensitive files that was not discarded by the image-matching technique;
    a determination module, stored in memory, that determines, based on the results of the finer image-matching technique, that the file violates the data-loss-prevention policy;
    a security module, stored in memory, that performs a security action in response to determining that the file violates the data-loss-prevention policy;
    at least one physical processor configured to execute the identification module, the comparison module, the determination module, and the security module.

12. The system of claim 11, wherein the security action comprises at least one of:
    blocking the attempt to transmit the file through the data-distribution channel;
    alerting an administrator to the attempt to transmit the file through the data-distribution channel;
    informing a user that the attempt to transmit the file through the data-distribution channel violates the data-loss-prevention policy;

logging the attempt to transmit the file through the data-distribution channel.

13. The system of claim 11, wherein the comparison module compares, using the image-matching technique, the file with the plurality of known sensitive files by converting the file into the image format.

14. The system of claim 11, wherein the known sensitive file comprises a text-based form and the determination module determines, based on the results of the finer image-matching technique, that the file violates the data-loss-prevention policy by determining that the file comprises an edited version of the text-based form.

15. The system of claim 11, wherein the comparison module compares, using the finer image-matching technique, the file with the known sensitive file by creating a difference image that represents a set of elements that are different between the known sensitive file and the file.

16. The system of claim 11, wherein the comparison module compares, using the finer image-matching technique, the file with the known sensitive file by identifying a set of key points within the file that are homologous to a set of key points within the known sensitive file.

17. The system of claim 11, wherein the comparison module compares, using the finer image-matching technique, the file with the known sensitive file by at least one of:
   comparing a single visual element of the file to a single visual element of the known sensitive file;
   comparing a set of distance ratios between key features of the file to a set of distance ratios between key features of the known sensitive file;
   comparing, using a distance metric, a set of feature vectors belonging to the file to a set of feature vectors belonging to the known sensitive file.

18. The system of claim 11, wherein the comparison module:
   compares, using the image-matching technique, the file with the plurality of known sensitive files by identifying a gallery of known sensitive files that are both stored in the image formats and protected by the data loss prevention policy;
   compares, using the finer image-matching technique that consumes more computing resources than the image-matching technique, the file and the at least one known sensitive file by comparing, using a final image-matching technique that consumes more computing resources than the finer image-matching technique, the file and at least one known sensitive file within the gallery not discarded by the finer image-matching technique.

19. The system of claim 11, wherein the determination module determines, based on the results of the finer image-matching technique, that the file violates the data-loss-prevention policy by determining that the file includes personally identifying information.

20. A non-transitory computer-readable medium comprising one or more computer-readable instructions that, when executed by at least one processor of a computing device, cause the computing device to:
   identify an attempt to transmit a file through a data-distribution channel;
   compare, using an image-matching technique, the file with a plurality of known sensitive files that are both stored in image formats and protected by a data-loss-prevention policy;
   compare, using a finer image-matching technique that consumes more computing resources than the image-matching technique, the file and at least one known sensitive file from the plurality of known sensitive files that was not discarded by the image-matching technique;
   determine, based on the results of the finer image-matching technique, that the file violates the data-loss-prevention policy;
   perform a security action in response to determining that the file violates the data-loss-prevention policy.

* * * * *